United States Patent
Parastegari et al.

(10) Patent No.: US 12,485,545 B2
(45) Date of Patent: *Dec. 2, 2025

(54) IMAGING DEVICE CONTROL IN VIEWING SYSTEMS

(71) Applicant: INTUITIVE SURGICAL OPERATIONS, INC., Sunnyvale, CA (US)

(72) Inventors: Mohammad Sina Parastegari, Cupertino, CA (US); Paul G. Griffiths, Santa Clara, CA (US); Brandon D. Itkowitz, San Jose, CA (US); Goran A. Lynch, Oakland, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 18/256,469

(22) PCT Filed: Dec. 8, 2021

(86) PCT No.: PCT/US2021/062464
§ 371 (c)(1),
(2) Date: Jun. 8, 2023

(87) PCT Pub. No.: WO2022/125697
PCT Pub. Date: Jun. 16, 2022

(65) Prior Publication Data
US 2024/0025050 A1    Jan. 25, 2024

Related U.S. Application Data

(60) Provisional application No. 63/123,936, filed on Dec. 10, 2020.

(51) Int. Cl.
B25J 9/16 (2006.01)
A61B 17/00 (2006.01)
(Continued)

(52) U.S. Cl.
CPC .............. *B25J 9/1689* (2013.01); *A61B 34/35* (2016.02); *A61B 90/37* (2016.02); *A61B 90/50* (2016.02); *B25J 9/1697* (2013.01)

(58) Field of Classification Search
CPC ....... B25J 9/1689; B25J 9/1697; A61B 34/35; A61B 90/37; A61B 90/50;
(Continued)

(56) References Cited

U.S. PATENT DOCUMENTS 5,876,325 A    3/1999  Mizuno et al.
6,424,885 B1   7/2002  Niemeyer et al.
(Continued)

FOREIGN PATENT DOCUMENTS

WO   WO-2020028777 A1   2/2020
WO   WO-2021041248 A1   3/2021
(Continued)

OTHER PUBLICATIONS

International Preliminary Report on Patentability for Application No. PCT/US2021/062464, mailed Jun. 22, 2023, 10 pages.
(Continued)

*Primary Examiner* — Harry Y Oh
(74) *Attorney, Agent, or Firm* — Artegis Law Group, LLP

(57) ABSTRACT

Techniques are disclosed for imaging device control in a computer-assisted device that includes a repositionable structure configured to support an imaging device, and a control system coupled to the repositionable structure. The control system is configured to: determine a position of a reference point offset from a display unit, convert the position of the reference point to a target position of another
(Continued)

reference point offset from the imaging device, determine a movement command of the first repositionable structure that moves the imaging device such that the another reference point moves toward the target position, and cause actuation of the repositionable structure based on the movement command.

25 Claims, 8 Drawing Sheets

(51) Int. Cl.
  *A61B 34/00* (2016.01)
  *A61B 34/20* (2016.01)
  *A61B 34/35* (2016.01)
  *A61B 90/00* (2016.01)
  *A61B 90/50* (2016.01)
(58) Field of Classification Search
  CPC .. A61B 2017/00216; A61B 2034/2048; A61B 34/76; A61B 2090/364; A61B 2090/372; A61B 2090/502; A61B 90/361
  See application file for complete search history.

(56) References Cited

U.S. PATENT DOCUMENTS

| | | | |
|---|---|---|---|
| 8,423,186 | B2 | 4/2013 | Itkowitz et al. |
| 8,442,661 | B1 * | 5/2013 | Blackwell ............... B25J 5/007 700/62 |
| 8,808,164 | B2 | 8/2014 | Hoffman et al. |
| 9,179,832 | B2 | 11/2015 | Diolaiti |
| 11,992,273 | B2 * | 5/2024 | Brisson ..................... G09G 5/00 |
| 2012/0059391 | A1 * | 3/2012 | Diolaiti .................. B25J 9/1689 606/130 |
| 2015/0018622 | A1 * | 1/2015 | Tesar ..................... A61B 50/13 600/202 |
| 2016/0183930 | A1 | 6/2016 | Herzlinger et al. |
| 2019/0076199 | A1 * | 3/2019 | Kline ................... H04N 13/279 |
| 2020/0261160 | A1 | 8/2020 | Peine et al. |
| 2024/0024049 | A1 | 1/2024 | Parastegari et al. |
| 2024/0268899 | A1 * | 8/2024 | Brisson ..................... G09G 5/00 |

FOREIGN PATENT DOCUMENTS

| | | |
|---|---|---|
| WO | WO-2021041249 A1 | 3/2021 |
| WO | WO-2021041253 A1 | 3/2021 |
| WO | WO-2022115795 A1 | 6/2022 |

OTHER PUBLICATIONS

International Search Report and Written Opinion for Application No. PCT/US2021/062464, mailed Apr. 5, 2022, 15 pages.

Vertut, J, and Coiffet, P., "Robot Technology: Teleoperation and Robotics Evolution and Development," English translation, Prentice-Hall, Inc., Inglewood Cliffs, Nj, USA 1986, vol. 3A, 332 pages.

* cited by examiner

A

B

IMAGING DEVICE CONTROL IN VIEWING SYSTEMS

RELATED APPLICATIONS

This application is a U.S. National Stage patent application of International Patent Application No. PCT/US2021/062464, filed Dec. 8, 2021, and claims the benefit to U.S. Provisional Application No. 63/123,936, filed Dec. 10, 2020, "Imaging Device Control in Viewing Systems," each of these related applications is incorporated by reference herein.

TECHNICAL FIELD

The present disclosure relates generally to electronic devices, and more particularly to control of devices with repositionable imaging devices.

BACKGROUND

More and more devices are being replaced with computer-assisted electronic devices. This is especially true in industrial, entertainment, educational, and other settings. As a medical example, the hospitals of today have large arrays of electronic devices being found in operating rooms, interventional suites, intensive care wards, emergency rooms, and/or the like. Many of these electronic devices may be capable of autonomous or semi-autonomous motion. It is also common for personnel to control the motion and/or operation of electronic devices using one or more input devices located at a user control system. As a specific example, minimally invasive, robotic telesurgical systems permit surgeons to operate on patients from bedside or remote locations. Telesurgery refers generally to surgery performed using surgical systems where the surgeon uses some form of remote control, such as a servomechanism, to manipulate surgical instrument movements rather than directly holding and moving the instruments by hand.

When an electronic device is used to perform a task at a worksite, one or more imaging devices (e.g., an endoscope, an optical camera, and/or an ultrasound probe) can capture images of the worksite that provide visual feedback to an operator who is monitoring and/or performing the task. The imaging device(s) may also be controllable to update a view of the worksite that is provided, via a display unit, to the operator. For example, the imaging device(s) could be attached to a repositionable structure that includes two or more links coupled together by one or more joints, where the repositionable structure can be moved (including through internal reconfiguration) to update a position and/or orientation of the imaging device at the worksite. In such a case, movement of the imaging device(s) may be controlled by the operator, another person, or automatically, and enable the view of the worksite to be changed.

One approach for controlling an imaging device is to move the imaging device to follow the motion of a display unit. For example, the head motion of an operator can be tracked via a sensor system and used to control the motion of the imaging device. Another approach for controlling an imaging device is to move the imaging device to follow the motion of a hand-operated controller. For example, the operator could control a hand-operated controller having two manipulators that can be manipulated jointly as a simulated handlebar. However, such approaches for controlling an imaging device based on different input modalities have not been combined to control the same imaging device.

Further, if the imaging device is unable to follow multiple input modalities due to range of motion limits associated with the imaging device and/or the repositionable structure to which the imaging device is mounted, collisions, and/or the like, the particular input modality that caused the issue cannot be easily identified to, e.g., provide haptic feedback that resists further attempts by the operator to move the particular input modality in the manner that cannot be followed.

Accordingly, improved methods and systems for controlling repositionable imaging devices are desirable.

SUMMARY

Consistent with some embodiments, a computer-assisted device includes a first repositionable structure configured to support an imaging device, and a control system coupled to the first repositionable structure. The control system is configured to: determine a position of a second reference point offset from a display unit, convert the position of the second reference point to a target position of a first reference point offset from the imaging device, determine a movement command of the first repositionable structure that moves the imaging device such that the first reference point moves toward the target position, and cause actuation of the first repositionable structure based on the movement command.

Consistent with some embodiments, a method of operating a computer-assisted device comprising a repositionable structure and one or more processors, the one or more processors communicatively coupled to the repositionable structure, includes determining a position of a first reference point offset from a display unit, converting a position of the first reference point to a target position of a second reference point offset from an imaging device, determining a movement command of the repositionable structure that moves the imaging device such that the first reference point moves toward the target position, wherein the repositionable structure is configured to support the imaging device; and causing actuation of the repositionable structure based on the movement command.

Other embodiments include, without limitation, one or more non-transitory machine-readable media including a plurality of machine-readable instructions which when executed by one or more processors are adapted to cause the one or more processors to perform any of the methods disclosed herein.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

DETAILED DESCRIPTION

Figure 1:
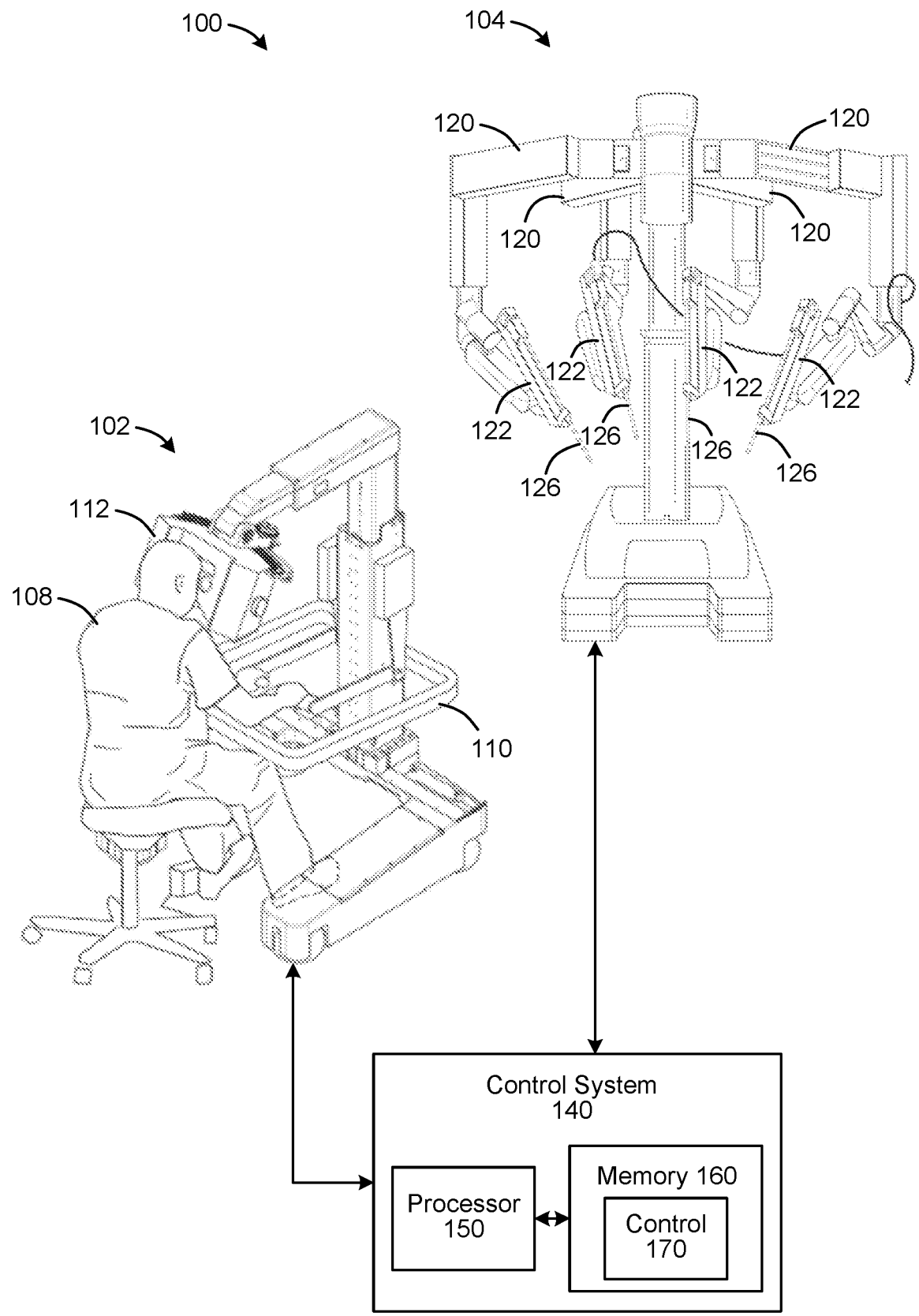
FIG. 1 is a simplified diagram of an example teleoperated system, according to various embodiments.

This description and the accompanying drawings that illustrate inventive aspects, embodiments, embodiments, or modules should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail in order not to obscure the invention. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Further, this description's terminology is not intended to limit the invention. For example, spatially relative terms—such as "beneath", "below", "lower", "above", "upper", "proximal", "distal", and the like—may be used to describe one element's or feature's relationship to another element or feature as illustrated in the figures. These spatially relative terms are intended to encompass different positions (i.e., locations) and orientations (i.e., rotational placements) of the elements or their operation in addition to the position and orientation shown in the figures. For example, if the content of one of the figures is turned over, elements described as "below" or "beneath" other elements or features would then be "above" or "over" the other elements or features. Thus, the exemplary term "below" can encompass both positions and orientations of above and below. A device may be otherwise oriented (rotated 90 degrees or at other orientations) and the spatially relative descriptors used herein interpreted accordingly. Likewise, descriptions of movement along and around various axes include various special element positions and orientations. In addition, the singular forms "a", "an", and "the" are intended to include the plural forms as well, unless the context indicates otherwise. And, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electrically or mechanically directly coupled, or they may be indirectly coupled via one or more intermediate components.

Elements described in detail with reference to one embodiment, embodiment, or module may, whenever practical, be included in other embodiments, embodiments, or modules in which they are not specifically shown or described. For example, if an element is described in detail with reference to one embodiment and is not described with reference to a second embodiment, the element may nevertheless be claimed as included in the second embodiment. Thus, to avoid unnecessary repetition in the following description, one or more elements shown and described in association with one embodiment, embodiment, or application may be incorporated into other embodiments, embodiments, or aspects unless specifically described otherwise, unless the one or more elements would make an embodiment or embodiment non-functional, or unless two or more of the elements provide conflicting functions.

In some instances, well known methods, procedures, components, and circuits have not been described in detail so as not to unnecessarily obscure aspects of the embodiments.

This disclosure describes various devices, elements, and portions of computer-assisted devices and elements in terms of their state in three-dimensional space. As used herein, the term "position" refers to the location of an element or a portion of an element in a three-dimensional space (e.g., three degrees of translational freedom along Cartesian x-, y-, and z-coordinates). As used herein, the term "orientation" refers to the rotational placement of an element or a portion of an element (three degrees of rotational freedom—e.g., roll, pitch, and yaw). As used herein, the term "shape" refers to a set positions or orientations measured along an element. As used herein, and for a device with repositionable arms, the term "proximal" refers to a direction toward the base of the computer-assisted device along its kinematic chain and "distal" refers to a direction away from the base along the kinematic chain.

Aspects of this disclosure are described in reference to computer-assisted systems and devices, which may include systems and devices that are teleoperated, remote-controlled, autonomous, semiautonomous, robotic, and/or the like. Further, aspects of this disclosure are described in terms of an embodiment using a surgical system, such as the da Vinci® Surgical System commercialized by Intuitive Surgical, Inc. of Sunnyvale, California. Knowledgeable persons will understand, however, that these examples are not limiting and the inventive aspects disclosed herein may be embodied and implemented in various ways, including robotic and, as applicable, non-robotic embodiments. For example, techniques described with reference to surgical instruments and surgical methods may be used in other contexts. Thus, the instruments, systems, and methods described herein may be used for humans, animals, portions of human or animal anatomy, industrial systems, general robotic, or teleoperational systems. As further examples, the instruments, systems, and methods described herein may be used for non-medical purposes including industrial uses, general robotic uses, sensing or manipulating non-tissue work pieces, cosmetic improvements, imaging of human or animal anatomy, gathering data from human or animal anatomy, setting up or taking down systems, training medical or non-medical personnel, and/or the like. Additional example applications include use for procedures on tissue removed from human or animal anatomies (without return to a human or animal anatomy) and for procedures on human or animal cadavers. Further, these techniques can also be used for medical treatment or diagnosis procedures that include, or do not include, surgical aspects.

System Overview

FIG. 1 is a simplified diagram of an example teleoperated system 100, according to various embodiments. In some examples, the teleoperated system 100 may be a teleoperated medical system such as a surgical system. As shown, the teleoperated system 100 includes a follower device 104 and a leader device in a leader-follower configuration. In the leader-follower configuration, the follower mimics the leader's motion. The leader device in FIG. 1 is shown as comprising an input system 102 in the form of a workstation (also called a "console). In various embodiments, the input system 102 may be in any appropriate form and may or may not include a workstation. In the FIG. 1 example, the follower device 104 is controlled by one or more input devices 106 of the input system 102, described in greater detail below. The leader-follower configuration is also sometimes referred to as a master-slave configuration, and systems that include leader and follower devices are also sometimes referred to as master-slave systems, where the leader is the "master," and the follower is the "slave."

In this example, the input system 102 includes one or more input devices which are contacted and manipulated by an operator 108. As shown, the input system 102 includes an input device 106 for use by each hand of the operator. The input devices 106 are supported by the input system 102 and may be mechanically grounded. An ergonomic support 110 (e.g., forearm rest) may be provided in some embodiments, on which the operator 108 may rest his or her forearms. In some examples, the operator 108 may perform tasks at a worksite near the follower device 104 during a procedure by commanding the follower device 104 using the input devices 106.

A display unit 112 is another input device included in the input system 102. The display unit 112 may display images for viewing by the operator 108. The display unit 112 may be moved in various degrees of freedom to accommodate the viewing position of the operator 108 and/or to provide control functions. In the example of the teleoperated system 100, displayed images may depict a worksite at which the operator 108 is performing various tasks by manipulating the input devices 106 and/or the display unit 112. In some examples, the images displayed by the display unit 112 may be received by the input system 102 from one or more imaging devices for capturing images arranged at the worksite. In other examples, the images displayed by the display unit may be generated by the display unit 112 (or by a connected other device or system), such as for virtual representations of tools, the worksite, or for user interface components.

When using the input system 102, the operator 108 may stand, or sit in a chair or other support, position his or her eyes to view the display unit 112, manipulate the input devices 106 and/or the display unit 112, and rest his or her forearms on the ergonomic support 110 as desired. In some embodiments, the operator 108 may stand at the input system 102 or assume other poses, and the display unit 112 and other input devices may be adjusted in position (height, depth, etc.) to accommodate the operator 108.

The teleoperated system 100 may also include the follower device 104, which may be commanded by the leader device, such as by the input system 102. In a medical example, the follower device 104 can be located near an operating table (e.g., a table, bed, or other support) on which a patient may be positioned. In such cases, the worksite may be provided on the operating table, e.g., on or in a patient, simulated patient or model, etc. (not shown). The follower device 104 shown includes a plurality of manipulator arms 120, each configured to couple to an instrument 122. The manipulator arms 120 are examples of repositionable structures on which instruments 122 (such as manipulation instruments or instruments with imaging devices) can be mounted. An instrument 122 may include, for example, an end effector 126 and a housing configured to couple to a manipulator arm 120.

In various embodiments, one or more of the instruments 122 may include an imaging device for capturing images (e.g., optical cameras, hyperspectral cameras, ultrasonic sensors, etc.). For example, one or more of the instruments 122 could be an endoscope that includes an imaging device, which may provide captured images of a portion of the worksite to be displayed via the display unit 112.

In some embodiments, the manipulator arms 120 may be controlled to move, articulate, or actuate the instruments 122 (such as by translating or rotating the entire instrument 122, articulating or actuating the end effector 126, or articulating any instrument joints proximal to the end effector 126) in response to manipulation of input devices by the operator 108, so that the operator 108 may perform tasks at the worksite. For a surgical example, the operator may direct the manipulator arms 120 to move instruments 122 to perform surgical procedures at internal surgical sites through minimally invasive apertures or natural orifices.

As shown, a control system 140 is provided external to the input system 102 and communicates with the input system 102. In other embodiments, the control system 140 may be provided in the input system 102 and/or in the follower device 104. As the operator 108 moves input device(s) 106 and/or the display unit 112, sensed spatial information including sensed position and/or orientation information is provided to the control system 140 based on the movement of the input devices 106 and/or the display unit 112. The control system 140 may determine or provide control signals to the follower device 104 to control the movement of the manipulator arms 120 or instruments 122 based on the received information and user input. In one embodiment, the control system 140 supports one or more wired communication protocols, (e.g., Ethernet, USB, and/or the like) and/or one or more wireless communication protocols (e.g., Bluetooth, IrDA, HomeRF, IEEE 802.11, DECT, Wireless Telemetry, and/or the like).

The control system 140 may be implemented on one or more computing systems. One or more computing systems may be used to control the follower device 104. In addition, one or more computing systems may be used to control components of the input system 102, such as to control movement of a display unit 112 in response to input provided by the head of the operator 108.

As shown, the control system 140 includes a processor 150 and a memory 160 storing a control module 170. In embodiments, the control system 140 may include one or more processors, non-persistent storage (e.g., volatile memory, such as random access memory (RAM), cache memory), persistent storage (e.g., a hard disk, an optical drive such as a compact disk (CD) drive or digital versatile disk (DVD) drive, a flash memory, etc.), a communication interface (e.g., Bluetooth interface, infrared interface, network interface, optical interface, etc.), and numerous other elements and functionalities. In addition, functionality of the control module 170 can be implemented in any technically feasible software and/or hardware.

Each of the one or more processors of the control system 140 may be an integrated circuit for processing instructions. For example, the one or more processors may be one or more cores or micro-cores of a processor, a central processing unit (CPU), a microprocessor, a field-programmable gate array (FPGA), an application-specific integrated circuit (ASIC), a digital signal processor (DSP), a graphics processing unit (GPU), a tensor processing unit (TPU), and/or the like.

A communication interface of the control system 140 may include an integrated circuit for connecting the computing system to a network (not shown) (e.g., a local area network (LAN), a wide area network (WAN) such as the Internet, mobile network, or any other type of network) and/or to another device, such as another computing system.

Further, the control system 140 may include one or more output devices, such as a display device, a printer, a speaker, external storage, or any other output device. Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform some embodiments of the invention.

Continuing with FIG. 1, the control system 140 may be connected to or be a part of a network. The network may include multiple nodes. The control system 140 may be implemented on one node or on a group of nodes. By way of example, the control system 140 may be implemented on a node of a distributed system that is connected to other nodes. By way of another example, the control system 140 may be implemented on a distributed computing system having multiple nodes, where different functions and/or components of the control system 140 may be located on a different node within the distributed computing system. Further, one or more elements of the aforementioned control system 140 may be located at a remote location and connected to the other elements over a network.

In some embodiments, one or more input devices may be ungrounded (ungrounded input devices being not kinematically grounded, and an example ungrounded input device is configured to be held by the hands of the operator 108 without additional physical support provided by hardware). Such ungrounded input devices may be used in conjunction with the display unit 112. In some embodiments, the operator 108 may use a display unit 112 positioned near the worksite, such that the operator 108 may manually operate instruments at the worksite, such as a laparoscopic instrument in a surgical example, while viewing images displayed by the display unit 112.

Some embodiments may include one or more components of a teleoperated medical system such as a da Vinci® Surgical System, commercialized by Intuitive Surgical, Inc. of Sunnyvale, California, U.S.A.

Figure 2:
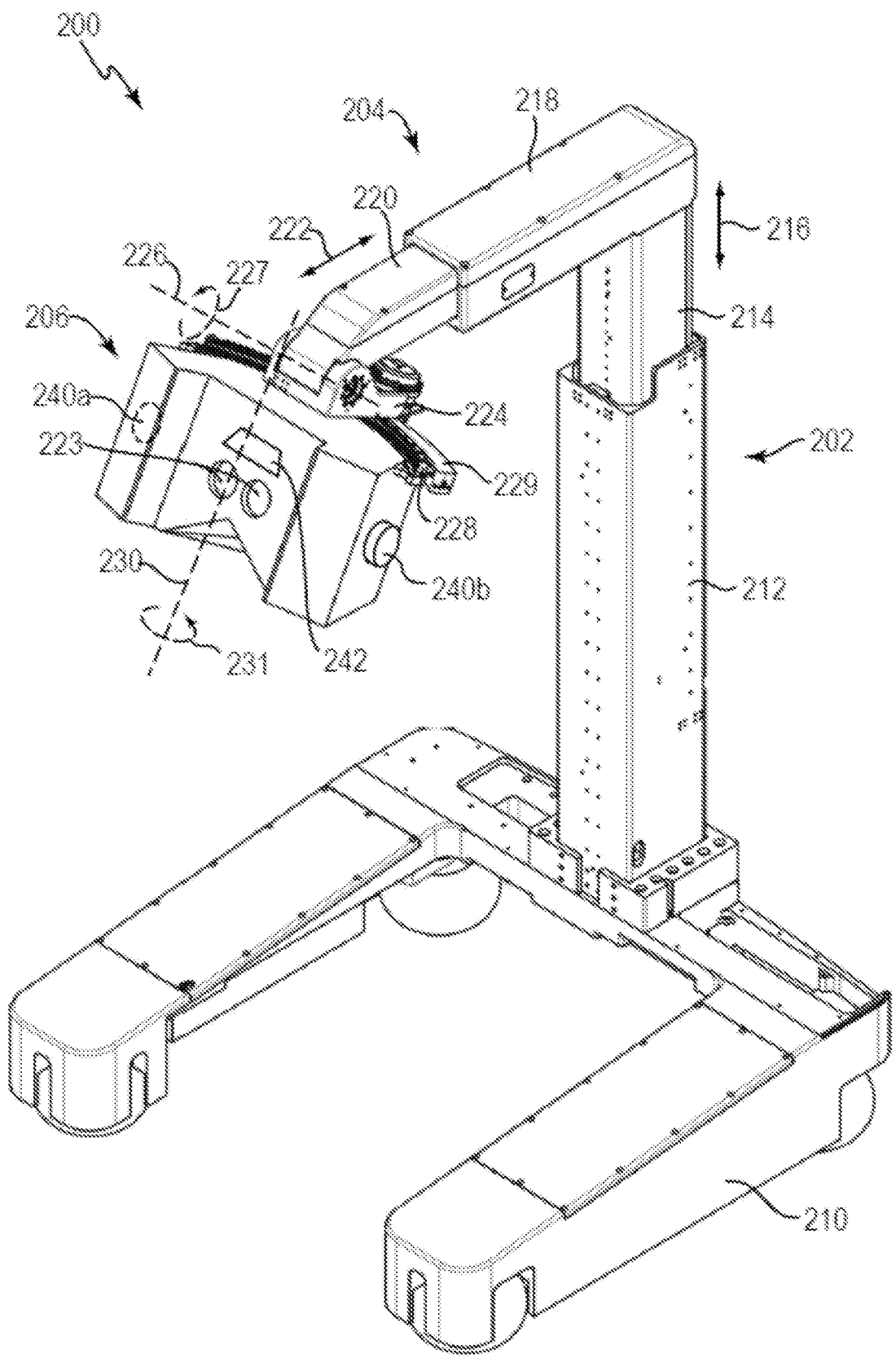
FIG. 2 is a perspective view of an example display system, in accordance with some embodiments.

FIG. 2 is a perspective view of an example display system 200, in accordance with various embodiments. In some embodiments, the display system 200 is used in a workstation of a teleoperated system (e.g., in the workstation shown in FIG. 1), or the display system 200 may be used in other systems or as a standalone system, e.g., to allow an operator to view a worksite or other physical site, a displayed virtual environment, etc. Although FIG. 2 shows a specific configuration, other embodiments may use different configurations.

The display system 200 includes a base support 202, an arm support 204, and a display unit 206, which corresponds to the display unit 112 in FIG. 1. The display unit 206 is provided with multiple degrees of freedom of movement provided by a support linkage including base support 202, arm support 204 coupled to the base support 202, and a tilt member 224 (described below) coupled to the arm support 204, where the display unit 206 is coupled to the tilt member 224.

The base support 202 may be a vertical member that is mechanically grounded, e.g., directly or indirectly coupled to ground, such as by resting or being attached to a floor. For example, the base support 202 may be mechanically coupled to a support structure 210 that is coupled to the ground. The base support 202 includes a first base portion 212 and a second base portion 214 coupled such that the second base portion 214 is translatable with respect to the first base portion 212 in a linear degree of freedom.

The arm support 204 may be a horizontal member that is mechanically coupled to the base support 202. The arm support 204 includes a first arm portion 218 and a second arm portion 220. The second arm portion 220 is coupled to the first arm portion 218 such that the second arm portion 220 is linearly translatable in a first linear degree of freedom (DOF) with respect to the first arm portion 218.

The display unit 206 may be mechanically coupled to the arm support 204. The display unit 206 may be moveable in a second linear DOF provided by the linear translation of the second base portion 214 and second arm portion 220.

In some embodiments, the display unit 206 includes a display device, e.g., one or more display screens, projectors, or other display devices, that may display digital images. The display unit 206 may include two viewports 223, where the display device is provided behind or included in the viewports. One or more display screens or other display devices may be positioned on the display unit 206 in place of the viewports 223 in some embodiments.

In some embodiments, the display unit 206 displays images of a worksite (e.g., an interior anatomy of a patient in a medical example), captured by an imaging device such as an endoscope. The worksite may alternatively be a virtual representation of a worksite. The images may show captured images or virtual renderings of instruments 122 of the follower device 104 while one or more of these instruments 122 are controlled by the operator via the input devices of the input system 102.

In some embodiments, the display unit 206 is rotationally coupled to the arm support 204 by a tilt member 224. In the illustrated example, the tilt member 224 is coupled at a first end to the second arm portion 220 of the arm support 204 by a rotary coupling configured to provide rotational motion of the tilt member 224 and the display unit 206 about the tilt axis 226 with respect to the second arm portion 220. In some embodiments, the tilt axis 226 is positioned above the display device in the display unit 206.

Each of the various degrees of freedom discussed herein may be passive and require manual manipulation, or be movable by one or more actuators, such as by one or more motors, solenoids, etc. For example, the rotational motion of the tilt member 224 and the display unit 206 about the tilt axis 226 may be driven by one or more actuators, such as by a motor coupled to the tilt member at or near the tilt axis 226.

The display unit 206 may be rotationally coupled to the tilt member 224 and may rotate about a yaw axis 230. For example, this may be lateral or left-right rotation from the point of view of an operator viewing images of the display unit 206 via the viewports 223. In this example, the display unit 206 is coupled to the tilt member by a rotary mechanism which may be a track mechanism. For example, in some embodiments, the track mechanism includes a curved track 228 that slidably engages a groove member 229 coupled to the tilt member 224, allowing the display unit 206 to rotate about the yaw axis 230 by moving the curved track 228 through a groove of the groove member 229.

The display system 200 may thus provide the display unit 206 with a vertical linear degree of freedom 216, a horizontal linear degree of freedom 222, a rotational (tilt) degree of freedom 227, and a rotational yaw degree of freedom 231. A combination of coordinated movement of components of the display system 200 in these degrees of freedom allow the display unit 206 to be positioned at various positions and orientations in a workspace of the display unit 206. The motion of the display unit 206 in the tilt, horizontal, and vertical degrees of freedom allows the display unit 206 to stay close to, or maintain contact with, the head of the operator when the operator is providing head input through head motion.

The degrees of freedom of the display system 200 allow the display system 200 to provide pivoting motion of the display unit 206 in physical space about a pivot axis that may be positioned in different locations. For example, the display system 200 may provide motion of the display unit 206 in physical space that corresponds to motion of a head of an operator when operating the display system 200. Such a motion may include rotation about a defined neck pivot axis that approximately corresponds to a neck axis of the head of the operator at the neck of the operator. The rotation allows the display unit 206 to be moved in accordance with the head of the operator that is directing movement of the display unit 206. In another example, the motion may include rotation about a defined forehead pivot axis that approximately corresponds to a forehead axis extending through the head of the operator at the forehead when the display unit 206 is oriented, as shown, in a centered yaw rotary position about the yaw axis 230.

Display unit 206 may include one or more input devices that allow an operator to provide input to manipulate the orientation and/or position of the display unit 206 in space, and/or to manipulate other functions or components of the display system 200 and/or a larger system, (e.g., a teleoperated system).

Illustratively, the display unit 206 includes a head input region 242. In some embodiments, the head input region 242 is positioned on a surface of the display unit 206 that is facing the head of the operator during operation of the display unit 206.

The head input region 242 may be shaped to form a headrest which may be in contact with the head of the operator when the operator is providing head input. More specifically, the head input region 242 may be located in a region above the viewports 223 to be in contact with the forehead of the operator while the operator is viewing images through the viewports 223. The display unit 206 may include one or more head input sensors that sense operator head input to the head input region 242 as commands to cause movement of the imaging device, or otherwise cause updating of the view in the images presented to the operator (such as by graphical rendering, digital zooming or panning, etc.). Further, in some embodiments and some instances of operation, the sensed head movement is used to move the display unit 206 to compensate for the head movement. The position of the head of the operator may, thus, remain stationary relative to the viewports 223, even when the operator performs head movements to control the view provided by the imaging device. A proper alignment of the eyes of the operator with the viewports may thus be ensured.

In some embodiments, sensing the operator head input includes sensing a presence or contact by a head of an operator or by a portion of the head (e.g., forehead) with the head input region 242. The one or more head input sensors may include any of a variety of types of sensors, e.g., resistance sensors, capacitive sensors, force sensors, optical sensors, etc.

Continuing with FIG. 2, the orientation and/or position of the display unit 206 may be changed by the display system 200 based on the operator head input to the head input region 242. For example, sensed operator input is provided to a control system (e.g., the control system 140), which controls actuators of the display system 200 to move the second base portion 214 in linear degree of freedom 216, the second arm portion 220 in linear degree of freedom 222, tilt member 224 in rotary degree of freedom 227, and/or display unit 206 in rotary degree of freedom 231, to cause the display unit 206 to be moved as commanded by (e.g., in accordance with) the sensed operator head input. Sensed operator head input may also be used to control other functions of the display system 200 and/or of a larger system (e.g., teleoperated system 100 of FIG. 1). Thus, in some embodiments, the operator may move his or her head to provide input to control the display unit 206 to be moved by the display system 200 in accordance with the motion of the head, thus allowing the display unit 206 to follow motions of the head of the operator and changes in viewing angle.

In some embodiments, images displayed by the display unit 206, and/or other controlled devices, are changed and manipulated based on the sensed motion of the display unit 206. In some embodiments of a display system, the display unit 206 is rotatable about yaw axis 230 in degree of freedom 231 and one or more of the other degrees of freedom 216, 222, and 227 are omitted from the display system 200. For example, the display unit 206 may be rotated about the yaw axis 230 (e.g., by actuator(s) and/or manually by an operator) and the display unit 206 may be manually positioned higher and/or lower (e.g., by actuator(s) and/or manually by an operator), e.g., using the base support 202 or other mechanism, where horizontal degree of freedom 222 and/or tilt degree of freedom 227 are omitted.

Those skilled in the art will appreciate that FIG. 2 merely shows an example for a configuration of a display system. Alternative configurations supporting movement of the display unit 206 based on an input from the operator are also possible. Any linkage that supports the desired movement of the display unit 206 may be used in lieu of the configuration shown in FIG. 2.

Although described herein primarily with respect to the display unit 206 that is part of a grounded mechanical structure (e.g., the display system 200), in other embodiments, the display unit may be any technically feasible display device or devices. For example, the display unit could be a handheld device, such as a tablet device or mobile phone, that is held by an operator. As another example, the display unit could be a head-mounted device (e.g., glasses, goggles, helmets). In such cases, the position and/or orientation of the display unit may be determined using one or more accelerometers, gyroscopes, inertial measurement units, cameras, and/or other sensors internal or external to the display unit.

Imaging Device Control Techniques

As described, in some embodiments, a head input device in a display unit can include one or more head input sensors that sense operator head input (e.g., head input that applies forces to, or moves or reconfigures, a display unit such as display unit 206). For example, the head input device in the display unit 206 can capture and convert head input provided by head forces or movements to commands for a repositionable structure to which the imaging device (e.g., within an endoscope) is mounted. In the example of an endoscope, the endoscope may capture and provide images of a portion of a worksite that is displayed for output via a display unit of an input system (e.g., the display unit 112 of the input system 102).

Figure 3:
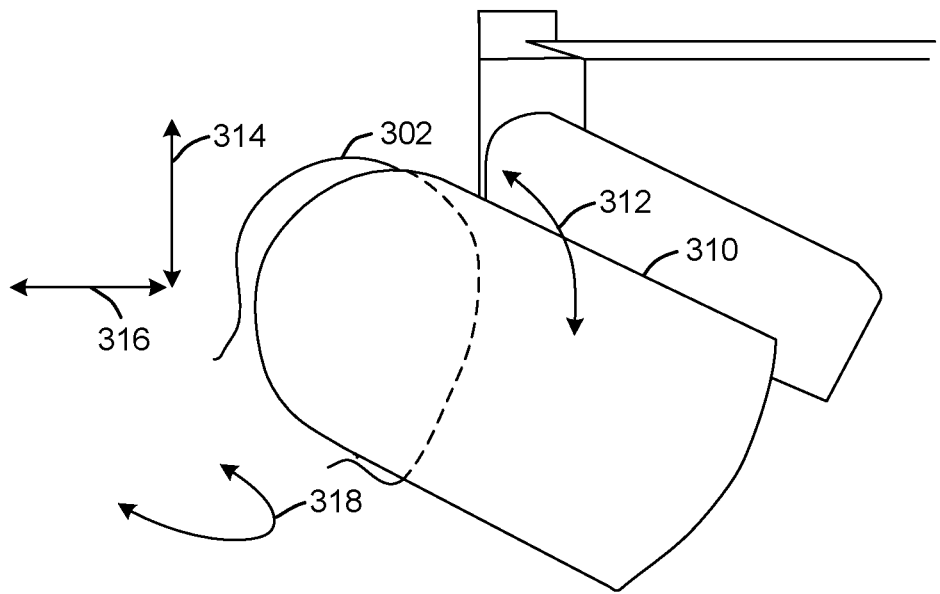
FIG. 3 shows that, in various examples, a display unit may have degrees of freedom that do not match the degrees of freedom of an imaging device.
Figure 3:
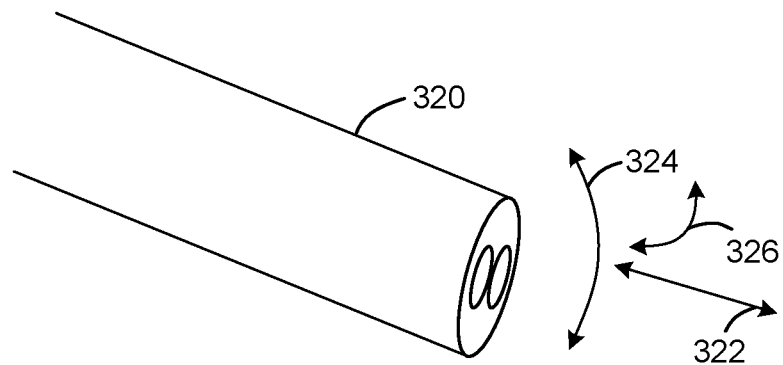

FIG. 3 shows various degrees of freedom of a display unit, a hand-operated controller, and an imaging device, according to various embodiments. As shown in panel A, in some examples, a display unit 310, corresponding to the display unit 112 of FIG. 1 and the display unit 206 of FIG. 2, is movable in four DOFs. In the particular system posture shown in FIG. 3, an operator 302 can translate the display unit 310 in the vertical (up and down on the page) DOF 314, and also the horizontal (left and right on the page) DOF 316. In the particular system posture shown, the operator 302 can also rotate the display unit 310 about a vertical axis (yaw) DOF 318 and rotate the display unit 310 about a horizontal axis (pitch) DOF 312. For example, as described above in conjunction with FIG. 2, the orientation and/or position of the display unit 206 may be changed based on operator head input to head input region 242 to manually move the display unit 206, or to control actuators of the display system 200 to move the display unit 206. For example, the manual or actuator-provided movement can follow the movement of the head of an operator by moving the second base portion 214 in linear degree of freedom 216, the second arm portion 220 in linear degree of freedom 222, the tilt member 224 in rotary degree of freedom 227, and/or the display unit 206 in rotary degree of freedom 231.

As shown in panel B, an imaging device 320, when mounted on a manipulator arm 120 comprising a repositionable structure and being operated, may be limited to move in three DOFs. In some examples, the imaging device 320 may be introduced into a worksite by an access port or cannula. For example, the imaging device 320 could be included in the endoscope, described above in conjunction with FIG. 1. In some such cases, the imaging device 320 may have a pitch DOF 324, a yaw DOF 326, and an insertion-retraction DOF 322 about a remote center of motion associated with the access port or cannula. For example, the imaging device 320 could be a 0° endoscope, in which case a direction of view of the imaging device 320 corresponds to the insertion direction of the insertion-retraction DOF 322. As another example, the imaging device could be a 30° endoscope, in which case the direction of view of the imaging device 320 would have a 30° deviation from the insertion direction of the insertion-retraction DOF 322. It should be noted that an endoscope could also have a roll DOF for rotation about the shaft of the endoscope, or one or more joints along the endoscope shaft that provides additional DOFs. However, the display unit 310 may not have corresponding DOFs for rolling or such additional joints.

Although described herein with respect to the display unit 310 configured to move in four DOFs as an example, in other embodiments, a display unit may be configured to move in more than four DOFs. For example, as described above in conjunction with FIG. 2, the display unit could be a handheld device, such as a tablet device or mobile phone, or a head-mounted device that an operator can translate and rotate like a rigid body in up to six DOFs. Although described herein with respect to the imaging device 320 having three DOFs as a reference example, in other embodiments, the imaging device 320 may have more than three DOFs. For example, the imaging device could be an endoscope having a distal end coupled to a shaft through one or more additional joints forming a "wrist" that provides one or more different DOFs than the three DOFs described above with respect to the imaging device 320. Although described herein primarily with respect to the display unit 310 that does not have a roll DOF, in other embodiments, such as when the display unit is a handheld device or head-mounted device, the display unit may have a roll DOF that can be mapped to the roll DOF of the imaging device 320. More generally, in some embodiments, the display unit 310 may have any suitable DOFs that differ in number and/or direction from the DOFs of the imaging device 320.

In some embodiments, movements of the display unit 310, which may generally follow the head movement of the operator 302, are not directly converted to movement commands for the imaging device 320. This may occur for embodiments where the display unit 310 and the imaging device 320 have matching DOFs and/or range of motion limits, and where the display unit 310 and the imaging device 320 have different DOFs and/or range of motion limits. In some examples, certain movements of the display unit 310 (e.g., up and down) cannot be explicitly followed by the imaging device 320 due to DOF or range of motion constraints, and, in such cases, attempting to control movement of the imaging device 320 to directly follow movement of the display unit 310 can produce unintended results, unintuitive results, and/or results that deviate from display unit 310 movement.

Figure 4:
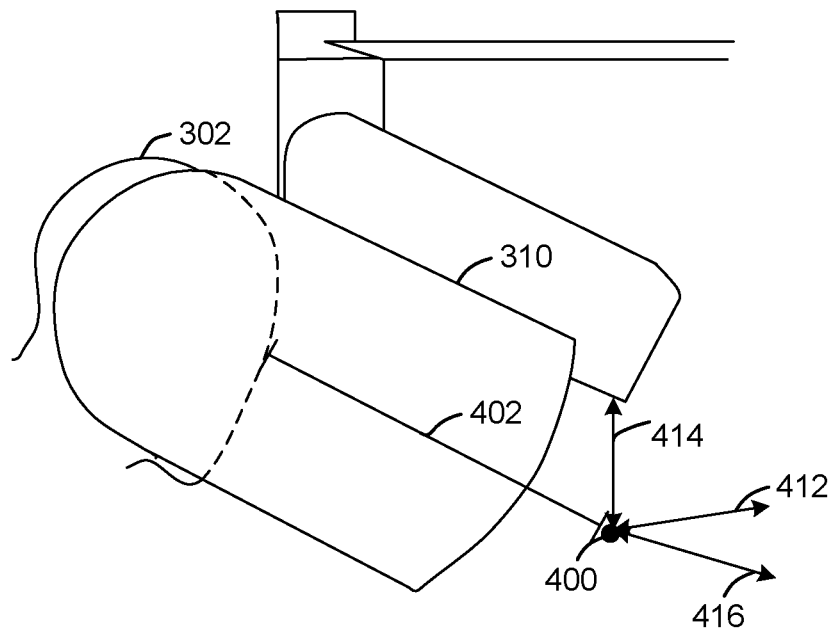
FIG. 4 illustrates a mapping between a reference point in a display unit workspace and a reference point in an imaging device workspace, according to various embodiments.
Figure 4:
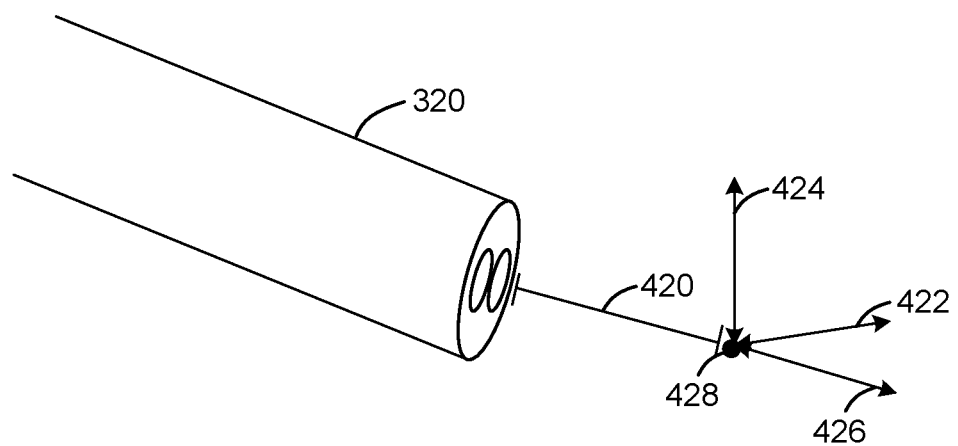

FIG. 4 illustrates a mapping between a reference point in a display unit workspace and a reference point in an imaging device workspace, according to various embodiments. As shown in panels 4A-B, in order to map the motion of the display unit 310 to a target motion of the imaging device 320, a control system (e.g., the control system 140) converts the position of a reference point 400 (also referred to herein as the "display unit reference point 400") that is offset from the display unit 310 to a target position of a reference point 428 (also referred to herein as the "imaging device reference point 428") that is offset from the imaging device 320. As shown, the display unit reference point 400 is offset from the display unit 310 by being a distance in front of the display unit in a direction away from the operator 302. Likewise, the imaging device reference point 428 is offset from the imaging device 320 by being a distance toward the field of view of the imaging device and "in front of" the imaging device 320. The control system converts the position of the display unit reference point 400 to the target position of the imaging device reference point 428 such that motion of the imaging device reference point 428 toward the target position is similar to motion of the display unit reference point 400. As a result, using the imaging device reference point 428 and the display unit reference point 400, operator input that changes the position of the display unit 310 can be mapped to commanded positions, velocities, or accelerations of the imaging device 320.

In some examples, the display unit reference point 400 is located at a distance 402 in front of lenses (e.g., lenses within the viewports 223 of the display unit 206) of the display unit 310 in a direction away from the operator 302, i.e., in front of eyes of the operator 302. In some examples, the display unit reference point 400 may be approximately 30 cm in front of the lenses of the display unit 310 in the direction away from the operator 302, which is roughly the distance between the eyes of the operator 302 and the hands of the operator 302. In some examples, such as in cases where the display unit is a handheld device or head-mounted device, the display unit reference point 400 may be approximately 30 cm in front of the eyes of the operator. Additionally, in some examples, including some cases where the display unit reference point 400 is approximately 30 cm in front of the eyes of the operator, the imaging device reference point 428 may be approximately 10 cm in front of a distal end of the imaging device 320, which is roughly the distance between the imaging device 320 and one or more remotely-operated instruments (e.g., the instruments 122 of the teleoperated follower device 104) at the worksite. In some embodiments, the distance of the display unit reference point 400 in front of the operator 302 and/or the distance of the imaging device reference point 428 in front of the imaging device 320 may not be fixed. For example, images captured by the imaging device 320 and presented to an operator via the display unit 310 may be modified by optical or digital zooming or panning of the imaging device 320 and/or optical zooming or panning applied to an image displayed by the display unit 310. In such cases, the imaging device reference point 428 can be moved relative to the imaging device 320 based on the optical or digital zooming and panning. For example, optical or digital zooming could move the imaging device reference point 428 along a central axis of a field of view and further away or closer relative to the imaging device 320, while optical or digital panning could move the imaging device reference point 428 off of a central axis of the field of view and laterally relative to the imaging device 320.

As shown, the position of the display unit reference point 400 can be represented in any appropriate coordinate system, such as with Cartesian coordinates ($x_d$, $y_d$, $z_d$), which are shown as the axes 412, 414, and 426. The position of the image device reference point 428 can also be represented in Cartesian coordinates ($x_i$, $y_i$, $z_i$), which are shown as the axes 422, 424, and 426. Irrespective of the DOFs of the display unit 310, described above in conjunction with FIG. 3, movement of the display unit 310 in any of the DOFs of the display unit 310 may be projected in front of the display unit 310 by the distance 402 to determine the display unit reference point 400 in terms of $x_d$, $y_d$, and $z_d$. A similar mapping may also be used to determine the relationship between movement of the imaging device 320 in any of the DOFs of the imaging device 320 to movement of the imaging device reference point 428 in $x_d$, $y_d$, and $z_d$ coordinates (or another coordinate system).

In some embodiments, the control system solves for the position of the display unit reference point 400 using forward kinematics and known joint positions of a repositionable structure supporting the display unit 310. For example, the control system could itself compute the joint positions needed to follow the head motions of the operator 302, or obtain those joint positions from another module that computes the joint positions, solve for a position of the lenses of the display unit 310 based on the joint positions, and add the distance 402 in front of the position of the lenses in a direction perpendicular to the view plane of the lenses to determine the position of the display unit reference point 400. In other embodiments, the control system can determine the position of the display unit reference point 400 in any technically feasible manner. For example, when the display unit is a handheld device and/or an ungrounded head-mounted display, the position of the display unit could be determined from data captured by sensors of the display unit and/or head-mounted display and/or using one or more external sensor systems. A distance can then be added to the position of the display unit to obtain the position of the display unit reference point.

In some embodiments, after determining the position of the display unit reference point 400, the control system generates a control command that controls the repositionable structure to which the imaging device 320 is mounted to achieve a corresponding position, such that the imaging device reference point 428 generally follows the position of the display unit reference point 400. The resulting position of the imaging device reference point 428 is also referred to herein as the "target" position. The target position may be defined with a scaling factor being applied; in such cases, the scaling factor is applied to motion of the display unit reference point 400 to obtain corresponding target positions for the imaging device reference point 428. For example, Cartesian motion of the display unit reference point 400 along the $x_d$, $y_d$, and $z_d$ degrees of freedom can be mapped to corresponding target positions subject to a scaling factor. In some examples, the scaling factor may be determined based on operator preference, a type of the display unit 310, a type of the imaging device 320, a procedure being performed, and/or the like.

In some embodiments, the repositionable structure to which the imaging device 320 is mounted may be actuated to update a position and/or orientation of the imaging device 320 at the worksite so that the imaging device reference point 428 moves to, or toward, the target position. In such cases, the control system can use the target position of the imaging device reference point 428 to determine the position of the distal end of the imaging device 320. The inverse kinematics of the imaging device 320 and/or the repositionable structure to which the imaging device 320 is mounted can then be used to determine how to actuate the joints of the imaging device 320 and/or the repositionable structure to which the imaging device 320 is mounted to move the imaging device 320 accordingly.

In some embodiments, one or more instruments (e.g., one or more of the instruments 122) are moved relative to a reference frame that does not change when the imaging device 320 moves. For example, in the follower mode described above, the one or more instruments could be moved relative to the reference frame based on commands generated using inputs from a hand-operated controller. In such a case, when the imaging device 320 is moved, the different views of an environment enabled by movement of the imaging device 320 does not affect the reference frame in which instruments are controlled. The different views of the environment only change the field of view of the imaging device 320 relative to the instruments, which changes an effective point of view presented by images captured by the imaging device 340 to an operator of the instruments.

Figure 5:
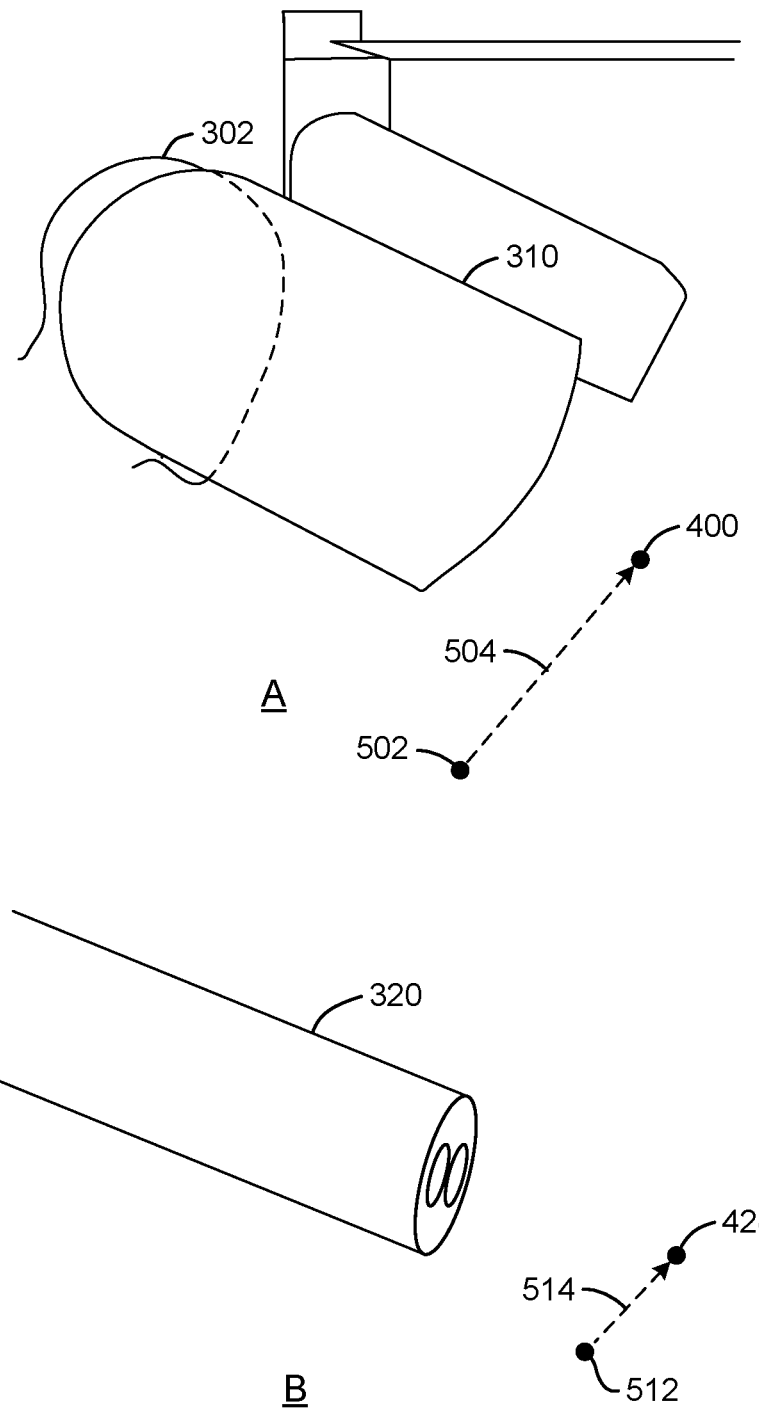
FIG. 5 illustrates deltas of the display unit reference point relative to the display unit baseline reference point, and of the imaging device reference point relative to the imaging device baseline reference point, according to various embodiments.

FIG. 5 illustrates deltas of the display unit reference point relative to the display unit baseline reference point, and of the imaging device reference point relative to the imaging device baseline reference point, according to various embodiments. As shown, in some examples, the position of the display unit reference point 400 is defined relative to the position of a display unit baseline reference point 502, and the position of the imaging device reference point 428 is defined relative to the position of an imaging device baseline reference point 512. For example, the display unit baseline reference point 502 and the imaging device baseline reference point 512 could be points at distances in front of the display unit 310 away from the operator 302 and in front of the imaging device 320, respectively, when the operator 302 selects to enter a mode in which movement of the display unit 310 is converted to commands to cause movement of the imaging device 320 to follow movement of the display unit 310. The position of the display unit reference point 400 at a subsequent time can then be represented as a delta 504 (also called "difference 504") denoted herein by $\Delta^{display\ unit}$, between the current display unit reference point 400 and the display unit baseline reference point 502. Similarly, the position of the imaging device reference point 428 at a subsequent time can represented as a delta 514 (also called "difference 514") denoted herein by $\Delta^{imaging\ device}$, between the current imaging device reference point 400 and the imaging device baseline reference point 512. As described, changes in position of the display unit reference point 400 can be mapped to changes in position of the imaging device reference point 428 by applying a scaling factor according to Equation 1.

$$\Delta^{imaging\ device} = \text{scaling} \times \Delta^{display\ unit}, \quad \text{Equation 1}$$

In Equation 1, the scaling factor can be, for example, static or variable. As a specific example, the scaling factor can be a selectable value of less than one (e.g., ⅓) for finer control of the imaging device 320, one for normal control of the imaging device 320, and/or greater than one (e.g., 1.5) for coarser control of the imaging device 320.

Further, in some embodiments, the control system can account for manual adjustments to the position of the display unit 310 and/or the position of the imaging device 320. For example, the operator 300 could make an ergonomic adjustment to the position of the display unit 310. In such a case, the position of the display unit 310 is moved (e.g., for operator ergonomics), and the control system does not command a movement of the imaging device 320 to follow that movement for ergonomic adjustment. As another example, the imaging device 320 could be manually adjusted if the operator 300 or someone else moved the imaging device 320 using another technique. In such cases, the position of the imaging device 320 is displaced, but the position of the display unit 310 does not change. As described in greater detail below, in some examples, when an ergonomic adjustment occurs that changes the position of the display unit 310, the control system (1) updates the display unit baseline reference point 502 based on a position and orientation of the display unit 310 at a completion of the ergonomic adjustment, which sets the delta 504 of the display unit reference point 400 to zero, (2) sets a correction equal to the delta 514 of the imaging device reference point 428, and (3) performs a ratcheting technique to reduce the correction over a number of movement cycles. Further, in some examples, when manual repositioning of the imaging device 320 occurs, the control system (1) updates the imaging device baseline reference point 512 based on a position and orientation of the imaging device 320 at a completion of the manual repositioning, which sets the delta 514 of the imaging device reference point 428 to zero, (2) determines a correction based on the delta 504 of the display unit reference point 400 multiplied by −1, and (3) performs a ratcheting technique to reduce the correction over a number of movement cycles.

In addition, in some embodiments, when the imaging device reference point 428 cannot follow the display unit reference point 400 due to, for example, range of motion (ROM) limits associated with the imaging device 320 and/or the repositionable structure to which the imaging device 320 is mounted, collisions, and/or the like, the control system may determine haptic feedback that is proportional to a difference between a delta of the imaging device reference point 428 that is achieved and a target delta of the imaging device reference point 428 that is determined based on the delta 504 of the display unit reference point 400 by applying the scaling factor, according to Equation 2.

$$F_{fbk} = \alpha \times (\Delta^{imaging\ device\ achieved} - \text{scaling} \times \Delta^{display\ unit}), \quad \text{Equation 2}$$

In Equation 2, $F_{fbk}$ is the force feedback and $\alpha$ is a proportionality constant. The control system can further convert the haptic feedback to joint forces and/or torques for joints of a repositionable structure to which the display unit 310 is mounted that resist further attempts by the operator to increase the difference between the delta of the imaging device reference point that is achieved and a target delta of the imaging device reference point 428 that is determined based on the delta 504 of the display unit reference point 400 by applying the scaling factor. In some examples, the haptic feedback may be determined and/or applied separately for each of the $x_d$, $y_d$, and/or $z_d$ axes of the display unit reference point 400.

Figure 6:
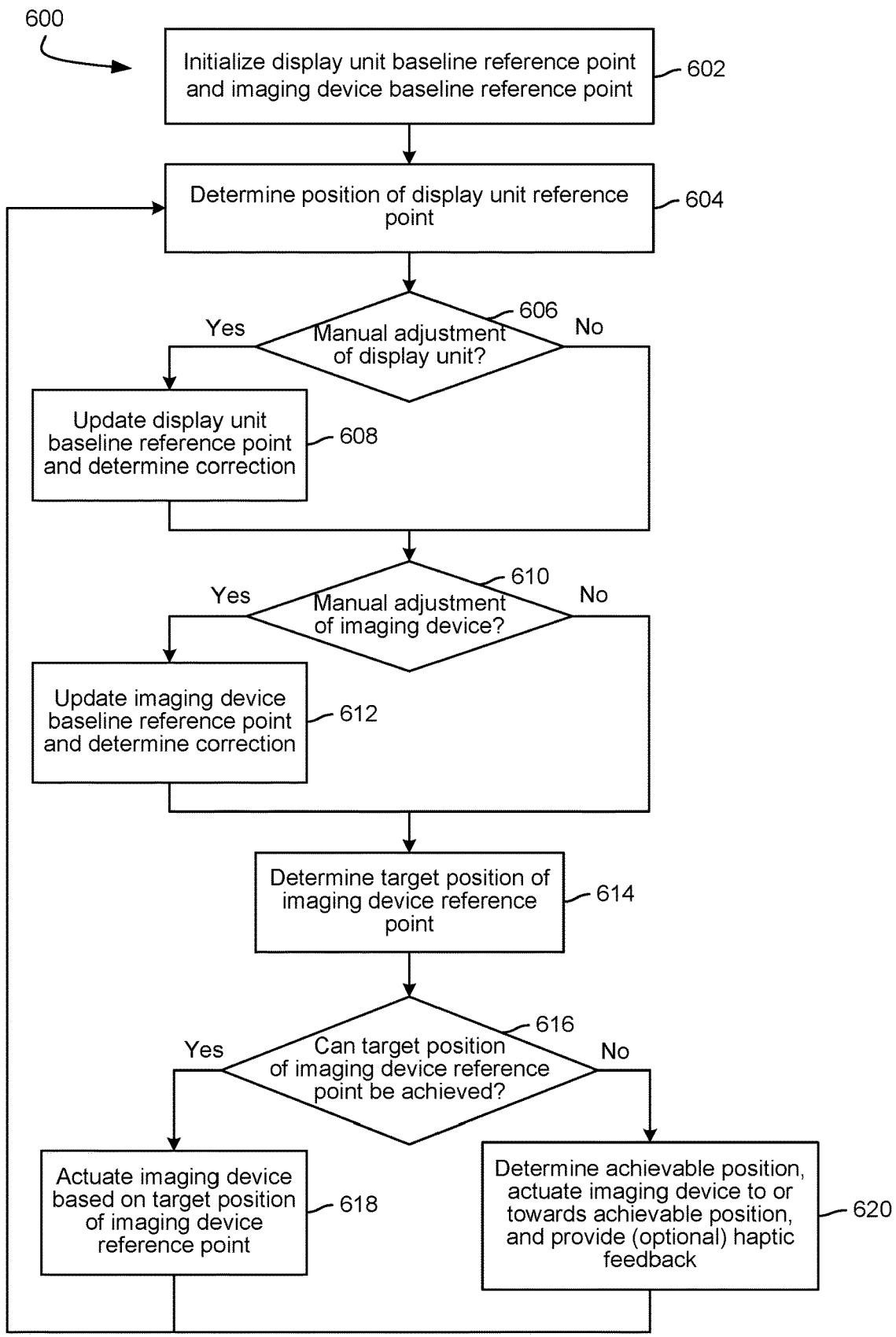
FIG. 6 illustrates a simplified diagram of a method for controlling an imaging device, according to various embodiments.

FIG. 6 illustrates a simplified diagram of a method 600 for controlling an imaging device, according to various embodiments. One or more of the processes 602-620 of method 600 may be implemented, at least in part, in the form of executable code stored on non-transitory, tangible, machine readable media that when run by one or more processors (e.g., the processor 150 in control system 140) may cause the one or more processors to perform one or more of the processes 602-620. In some embodiments, method 600 may be performed by one or more modules, such as control module 170 in the control system 140. In some embodiments, method 600 may include additional processes, which are not shown. In some embodiments, one or more of the processes 602-620 may be performed, at least in part, by one or more of the units of control system 140.

As shown, the method 600 begins at process 602, where the display unit baseline reference point 502 and the imaging device baseline reference point 512 are initialized. In some embodiments, the display unit baseline reference point 502 and the imaging device baseline reference point 512 are initialized to the display unit reference point 400 and the imaging device reference point 428 that are at distances in front of the display unit 310 in a direction away from an operator and in front of the imaging device 320, respectively, when the operator selects entry into a mode in which movement of the display unit 310 is converted to commands that cause movement of the imaging device 320 to follow the movement of the display unit 310. As described, the position of the display unit reference point 400 at subsequent times can be expressed as the difference, or delta, between the current display unit reference point and the display unit baseline reference point 502. Similarly, the position of the imaging device reference point 428 at subsequent times can be expressed as the difference, or delta, between the current imaging device reference point and the imaging device baseline reference point 512.

At process 604, the position of the display unit reference point 400 is determined. In some embodiments, the position of the display unit reference point 400 is determined at a distance in front of the display unit 310 in the direction away from the operator. In some examples, the position of the display unit reference point 400 can be determined using forward kinematics based on joint positions of a repositionable structure to which the display unit 310 is mounted, such as when the display unit follows head movement of the operator 300. In other examples, the position of the display unit reference point 400 can be determined in any technically feasible manner, such as via one or more sensors of the display unit and/or using one or more external tracking systems.

At process 606, if the display unit 310 has been manually adjusted, then the method 600 continues to process 608, where the display unit baseline reference point 502 is updated and a correction is determined. As described, the display unit 310 could be manually adjusted when, for example, the operator 300 makes an ergonomic adjustment to the position of the display unit 310. In some examples, the display unit baseline reference point 502 is updated by setting the display unit baseline reference point 502 to the position of the display unit reference point 400 at a completion of the manual adjustment to the display unit 310. In addition, a correction in the mapping between the display unit reference point 400 and the imaging device reference point 428 is created, and then gradually reduced to zero via a ratcheting technique described below, to correct for the change in the display unit baseline reference point 502, and to avoid a jump in the position of the imaging device reference point. In some examples, the correction is defined as a difference between the delta 514 of the imaging device reference point 428 and the delta 504 of the display unit reference point 400, described above in conjunction with FIG. 5. For example, the correction can be determined by solving for the correction in Equation 3.

$$\Delta^{imaging\ device} = scaling \times \Delta^{display\ unit} + correction \quad \text{Equation 3}$$

In such cases, the delta 504 of the display unit reference point 400 becomes zero when the display unit baseline reference point 502 is reset, and the correction is then equal to the delta 514 of the imaging device reference point 428. Such an correction keeps the delta 514 of the imaging device reference point 428 the same after the delta 504 of the display unit reference point 400 is moved by the operator 300, so that the operator 300 does not see a discontinuous change to another position when a new delta of the imaging device baseline reference point 428 is determined based on a delta of the display unit reference point 400 relative to the new display unit baseline reference point. That is, the correction compensates for discrepancies that may arise between the delta 504 of the display unit reference point 400 and the delta 514 of the imaging device reference point 428 caused by the manual adjustment to the display unit 310. As described in greater detail below, the correction is ratcheted to zero over a number of a movement cycles, after which the delta 514 of the imaging device reference point 428 follows the delta 504 of the display unit reference point 400 according to Equation 1.

If the imaging device 320 is determined to have been manually adjusted at process 610, then the method 600 continues to process 612, where the imaging device baseline reference point 512 is updated and a correction is determined. In some examples, the imaging device baseline reference point 512 is updated by setting the imaging device baseline reference point 512 to the position of the imaging device reference point 428 at a completion of the manual adjustment to the imaging device 320. Similar to process 608, a correction in the mapping between the display unit reference point 400 and the imaging device reference point 428 is determined at process 610, and then gradually reduced to zero via a ratcheting technique, to correct for the changing imaging device baseline reference point. In some examples, the correction is set to the delta 504 of the display unit reference point 400 multiplied by −1 (and an optional scaling factor), because the delta of the imaging device reference point in Equation 3 becomes zero when the imaging device baseline reference point 512 is updated.

Figure 7:
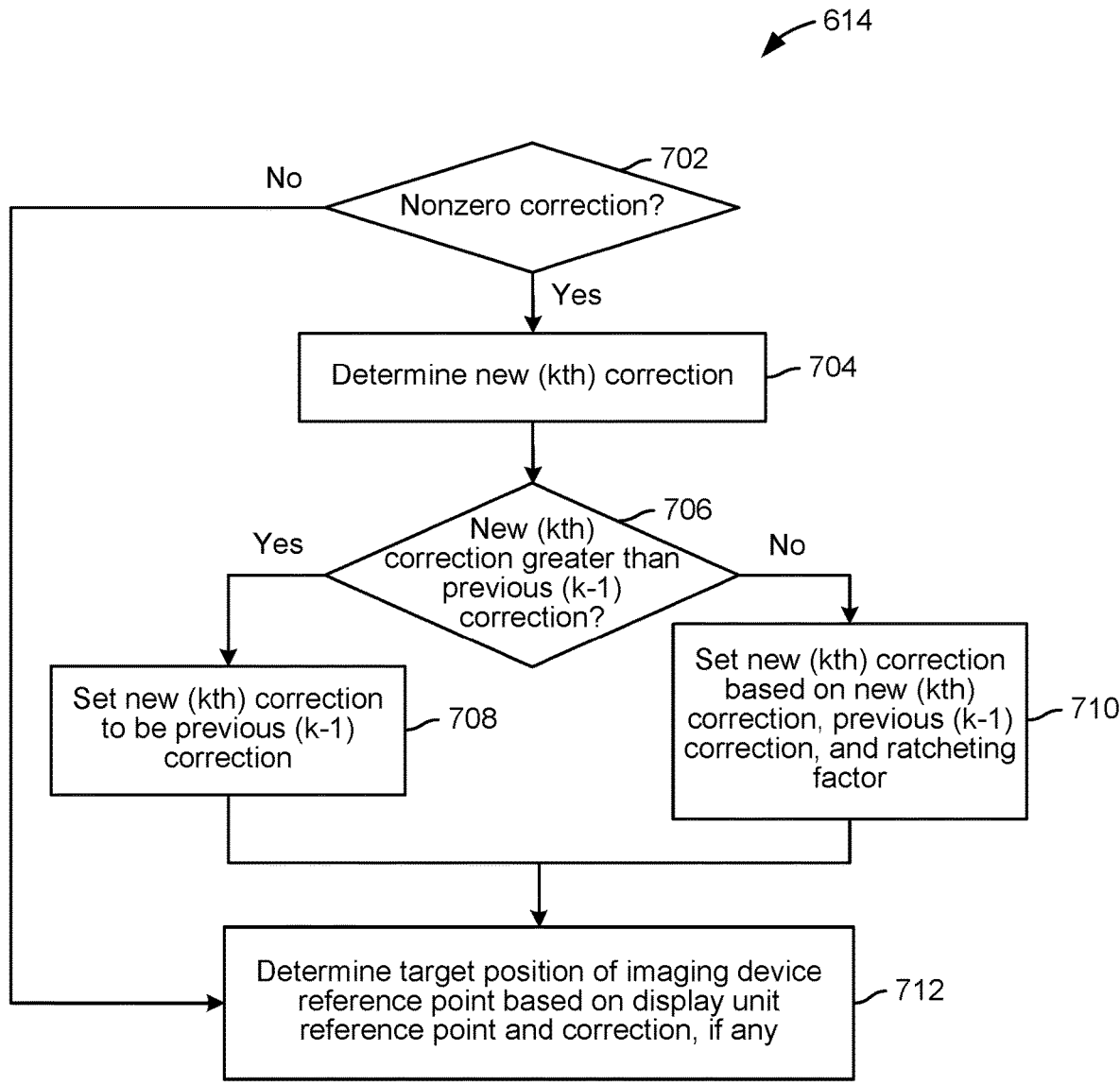
FIG. 7 illustrates in greater detail one process of the method of FIG. 6, according to various embodiments.

Subsequent to process 612, or if the imaging device 320 is not determined to be have been manually adjusted at process 610, a target position of the imaging device reference point 428 is determined at process 614. FIG. 7 illustrates process 614 in greater detail, according to various embodiments. In some embodiments, processes 702-710 are performed separately for each of a number of axes (e.g., each of the x, y, and z axes). As shown, at process 702, if a nonzero correction from a previous movement cycle is identified, then the method 600 continues to process 704, where a new (kth) correction is determined. In some examples, the new (kth) correction can be determined as:

$$\text{offset}_k = \Delta_{k-1}^{imaging\ device} - scaling \times \Delta_k^{display\ unit} \quad \text{Equation 4}$$

where k and k−1 indicate the k and k−1th movement cycles, respectively.

At process 706, if a magnitude of the new (kth) correction is greater than a magnitude of the previous (k−1) correction, then at process 708, the correction is set to be the previous (k−1) correction. On the other hand, if the magnitude of the kth correction is not greater than a magnitude of the previous (k−1) correction, then at process 710, the correction is set based on the new (kth) correction, the previous (k−1) correction, and a ratcheting factor. In some examples, processes 706-710 can be implemented according to Equation 5.

If $|correction_k| > |correction_{k-1}|$ Then $$correction_k = correction_{k-1}$$

Else $$correction_k = r \times correction_k + (1-r) \times correction_{k-1} \quad \text{Equation 5}$$

where r is a ratcheting factor 0<r≤1. In some examples, r may be selected based on one or more of operator preference, a type of the display unit 310, a type of the imaging device 320, a procedure being performed, and/or the like.

Subsequent to processes 708 and 710, or if no correction is identified at process 702, a target position of the imaging device reference point 428 is determined based on the display unit reference point 400 and the correction, if any, at process 712. In some examples, process 712 can be implemented according to Equation 6.

$$\Delta_k^{imaging\ device} = scaling \times \Delta_k^{display\ unit} + offset_k \quad \text{Equation 6}$$

In Equation 6, the correction (from Equation 5) is used to reduce the motion of the imaging device reference point 428 based on the ratcheting factor, until the correction becomes zero after a number of cycles. The more the motion of the imaging device reference point 428 is reduced, the more noticeable the effect will be to the operator, but the more quickly the correction is eliminated so that the imaging device reference point 428 can follow the display unit reference point 400 according to Equation 1. In some examples, the ratcheting factor r may be set to 1. In such cases, the imaging device reference point 428 (and the image that the operator sees) would not move, until the correction is eliminated and the imaging device reference point 428 directly follows the display unit reference point 400. In addition, by permitting the correction to only change to a smaller number, the correction is guaranteed to converge to zero and the delta 514 of the imaging device reference point 428 to converge to the delta 504 of the display unit reference point 400 (multiplied by the scaling factor).

Returning to FIG. 6, after the target position of the imaging device reference point 428 is determined, the method 600 continues to process 616. At process 616, if the target position of the imaging device reference point 428 can be achieved, then the method 600 continues to process 618, where the imaging device 320 is actuated based on the target position of the imaging device reference point 428.

In some instances, if the target position of the imaging device reference point 428 cannot be achieved, then the method 600 proceeds directly to process 620, where an achievable position is determined based on the target position of the imaging device reference point 428, and the imaging device 320 is actuated to or toward the achievable position. In some examples, haptic feedback is also provided. For example, the operator 300 could move the display unit into a position that the imaging device 320 cannot follow due to DOF or range of motion limits associated with the imaging device 320 and/or the repositionable structure to which the imaging device 320 is mounted, collisions, and/or the like. In such a case, the imaging device 320 may be repositioned to an achievable position; haptic feedback may also be provided. The haptic feedback may urge the operator to move the display unit toward a position corresponding to an achievable target position for the imaging device, may resist further movement of the display unit corresponding to target positions that increase the difference between the delta of the imaging device reference point that is achieved and a target delta of the imaging device reference point that is determined based on the delta of the display unit reference point.

Figure 8:
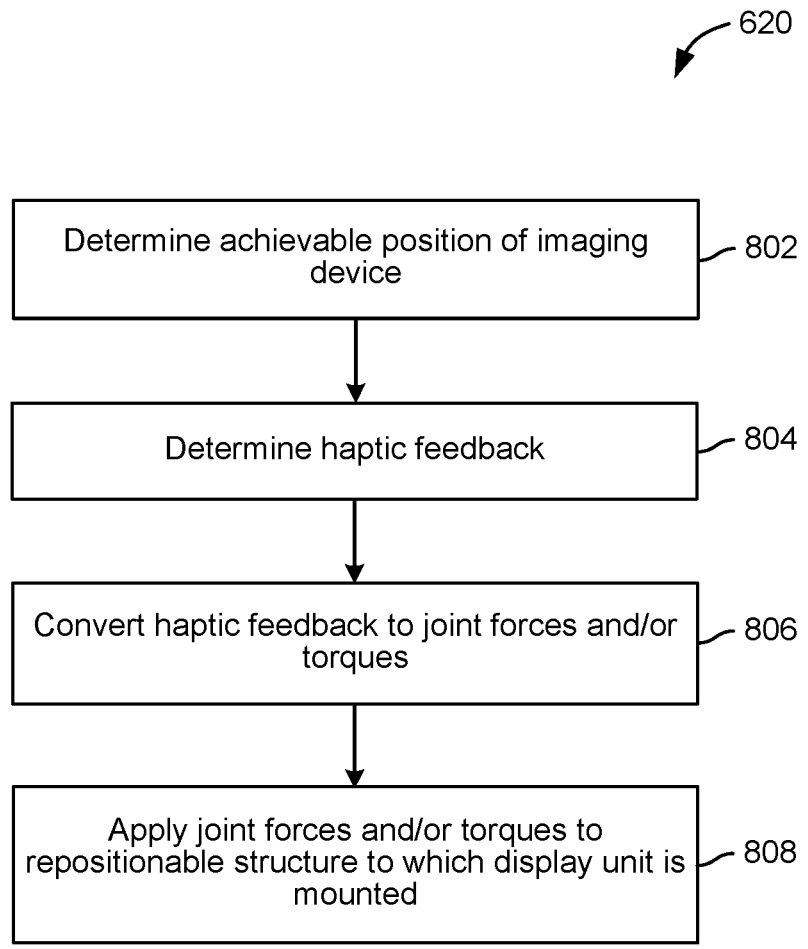
FIG. 8 illustrates in greater detail another process of the method of FIG. 6, according to various embodiments.

FIG. 8 illustrates in greater detail process 620, according to various embodiments. In some embodiments, processes 802-808 are performed separately for each of a number of axes (e.g., each of the x, y, and z axes).

As shown, at process 802, an achievable position of the imaging device 320 is determined. As described, the achievable position may be determined, based on the target position, as a position of the imaging device 320 that can be achieved while satisfying DOF or range of motion limits associated with the imaging device 320 and/or the repositionable structure to which the imaging device 320 is mounted, collision constraints, and/or the like.

At process 804, haptic feedback is determined. In some examples, the haptic feedback can be determined as a force that is proportional to a difference between a delta of the imaging device reference point that is achieved and a target delta of the imaging device reference point that is determined based on the delta of the display unit reference point, according to Equation 2.

At process 806, the haptic feedback is converted to joint forces and/or torques. In some examples, the haptic feedback can be converted via inverse kinematics to joint forces and/or torques for joints of the repositionable structure to which the display unit 310 is mounted. In other examples, the haptic feedback may be converted to any technically feasible form(s), such as vibration of a handheld device and/or a head-mounted device.

At process 808, the joint forces and/or torques (or other form(s) of haptic feedback) is applied to the repositionable structure to which the display unit 310 is mounted. In some examples, one or more commands may be generated and sent to the controllers for the joints in the repositionable structure to which the display unit 310 is mounted to provide the joint forces and/or torques (or other form(s) of haptic feedback).

Returning to FIG. 6, after the imaging device 320 is actuated to or towards a new position by either process 618 or 620, a next movement cycle begins by returning to process 604.

The disclosed embodiments control a repositionable imaging device by using a display unit reference point offset from a display unit, as the display unit moves. The disclosed embodiments convert a position of the display unit reference point to a target position of an imaging device reference point. The imaging device reference point is offset from the imaging device. The disclosed embodiments command the repositioning of the imaging device based on the target position of the imaging device reference point. In the context of a teleoperated system, the offset of the display unit reference point can be a distance in front of display unit in a direction away from an operator, and can be a nominal working distance between the display unit and the hands of the operator. Also in the context of a teleoperated system, the offset of the imaging device reference point can be a second distance in front of the imaging device, which can be a nominal working distance between the imaging device and one or more instruments being teleoperated. When an ergonomic adjustment occurs, a baseline reference point, from which the display unit reference point is calculated as a delta, is updated based on a position and orientation of the display unit at a completion of the ergonomic adjustment; further, in some instances, a correction is set equal to a delta of the imaging device reference point, and a ratcheting technique is performed to reduce the correction. When manual repositioning of the imaging device occurs, the baseline reference point of the imaging device is updated; further, in some instances, an correction is determined based on the delta of the display unit reference point multiplied by −1, and the ratcheting technique is performed to reduce the correction. In addition, in some instances, when the imaging device reference point cannot follow the display unit reference point, haptic feedback can be provided that is based on a difference between the delta of the imaging device reference point that is achieved and a target delta of the imaging device reference point that is determined based on the delta of the display unit reference point; for example, the haptic feedback can be proportional to such a difference.

Advantageously, the disclosed embodiments permit the motion of a repositionable imaging device to be similar to the motion of the display unit for commanding motion of the imaging device. Doing so can provide more intuitive control to an operator who is moving the display unit, even where the degrees of freedom of the display unit and the imaging device differ, and/or the ranges of motion of the display unit and the imaging device differ. In addition, the disclosed embodiments can reduce or avoid unintended imaging device or display unit motion, or reduce or avoid discontinuities in control of the imaging device, when the operator makes an ergonomic adjustment to the display unit or a manual repositioning of the imaging device.

One or more of the processes the method shown in FIGS. 6 to 9 may be partially or wholly implemented in the form of executable code stored on non-transitory, tangible, machine readable media that when run by one or more processors (e.g., the processor 150 in control system 140) may cause the one or more processors to perform one or more of the processes of method 600 and/or the processes of any of FIGS. 6, 7, and/or 8 In some embodiments, the processes may be performed by one or more modules, such as control module 170 in the control system 140. In some embodiments, method 600 may include additional processes, which are not shown. Some common forms of machine readable media that may include the processes of method 600 and/or the processes of FIGS. 6, 7, and/or 8 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A computer-assisted device comprising:
a first repositionable structure configured to support an imaging device; and
a control system coupled to the first repositionable structure, wherein the control system is configured to:
determine a position of a second reference point, the second reference point being offset from a display unit,
convert the position of the second reference point to a target position of a first reference point, the first reference point being offset from the imaging device,
determine, based on the target position of the first reference point, a movement command of the first repositionable structure that moves the imaging device such that the first reference point moves toward the target position, and
cause actuation of the first repositionable structure based on the movement command.

2. The computer-assisted device of claim 1, wherein the second reference point is offset from the display unit by being in front of the display unit in a direction away from an operator, and the first reference point is offset from the imaging device by being in front of the imaging device in a direction of a field of view of the imaging device.

3. The computer-assisted device of claim 1, wherein the control system is further configured to: determine the offset of the first reference point based on:
a zoom level of the imaging device; or
a digital zooming or panning applied to an image shown by the display unit.

4. The computer-assisted device of claim 1, further comprising a second repositionable structure configured to support the display unit, wherein the position of the second reference point is determined based on forward kinematics of the second repositionable structure, and wherein the computer-assisted device is a teleoperated medical device.

5. The computer-assisted device of claim 1, further comprising a second repositionable structure configured to support the display unit, wherein the imaging device and the first repositionable structure together have a first plurality of degrees of freedom, wherein the display unit and the second repositionable structure together have a second plurality of degrees of freedom different from the first plurality of degrees of freedom.

6. The computer-assisted device of claim 1, wherein to convert the position of the second reference point to the target position of the first reference point, the control system is configured to:
determine a first difference between the second reference point and a baseline reference point of the display unit;
determine a second difference for the first reference point based on the first difference; and
determine the target position of the first reference point from the second difference and a baseline reference point of the imaging device.

7. The computer-assisted device of claim 6, wherein the control system is furrther configured to:
determine the baseline reference point of the display unit based on the position of the second reference point at an entry to a first mode, wherein, in the first mode, movement of the display unit is used to control movement of the imaging device; and
determine the baseline reference point of the imaging device based on a configuration of the imaging device at the entry to the first mode.

8. The computer-assisted device of claim 6, wherein to determine the second difference based on the first difference, the control system is configured to scale the first difference according to a scaling factor.

9. The computer-assisted device of claim 8, wherein:
the scaling factor is determined based on one or more parameters selected from a group consisting of: a type of the display unit, a type of the imaging device, and a procedure being performed; or
to convert the position of the second reference point to the target position of the first reference point, the control system is further configured to add a correction to the second difference.

10. The computer-assisted device of claim 1, wherein the control system is further configured to, in response to identifying a manual adjustment to the display unit:
set a baseline reference point of the display unit to the position of the second reference point at a completion of the manual adjustment to the display unit;
set a first correction based on a difference between the first reference point and a baseline reference point of the imaging device; and
reduce the first correction over one or more movement cycles.

11. The computer-assisted device of claim 10, wherein to reduce the first correction for a first movement cycle, the control system is configured to:
determine a second correction for the first movement cycle based on a difference between the first reference point and the baseline reference point of the imaging device for the first movement cycle and a difference between the first reference point and the baseline reference point of the display unit from a previous movement cycle; and
when a magnitude of the second correction is not greater than a magnitude of the first correction, set the first correction based on the first correction, the second correction, and a ratcheting factor.

12. The computer-assisted device of claim 1, wherein the control system is further configured to, in response to identifying a manual adjustment to the imaging device:
set a baseline reference point of the imaging device to the position of the first reference point at a completion of the manual adjustment to the imaging device;

set a first correction based on a difference between the second reference point and a baseline reference point of the display unit; and reduce the first correction in one or more movement cycles.

13. The computer-assisted device of claim 1, wherein the control system is further configured to, in response to determining that the first repositionable structure cannot achieve the movement command:

determine haptic feedback based on a difference between a position of the first reference point that can be achieved and the target position of the first reference point;

determine joint forces or torques for joints in a second repositionable structure configured to support the display unit based on the haptic feedback; and cause actuation of the joints in the second repositionable structure based on the determined joint forces or torques.

14. A method of operating a computer-assisted device comprising a repositionable structure and one or more processors, the one or more processors communicatively coupled to the repositionable structure, the method comprising:

determining, by the one or more processors, a position of a first reference point, the first reference point being offset from a display unit;

converting, by the one or more processors, a position of the first reference point to a target position of a second reference point, the second reference point being offset from an imaging device;

determining, by the one or more processors, based on the target position of the second reference point, a movement command of the repositionable structure that moves the imaging device such that the first reference point moves toward the target position, wherein the repositionable structure is configured to support the imaging device; and causing, by the one or more processors, actuation of the repositionable structure based on the movement command.

15. The method of claim 14, wherein the second reference point is offset from the display unit by being in front of the display unit in a direction away from an operator, and the first reference point is offset from the imaging device by being in front of the imaging device in a direction of a field of view of the imaging device.

16. The method of claim 14, further comprising: determining the offset of the first reference point based on:
a zoom level of the imaging device; or
a digital zooming or panning applied to an image shown by the display unit.

17. The method of claim 14, wherein converting the position of the second reference point to the target position of the first reference point comprises:

determining a first difference between the second reference point and a baseline reference point of the display unit;

determining a second difference for the first reference point based on the first difference; and determining the target position of the first reference point from the second difference and a baseline reference point of the imaging device.

18. The method of claim 17, further comprising:

determining the baseline reference point of the display unit based on the position of the second reference point at an entry to a first mode, wherein, in the first mode, movement of the display unit is used to control movement of the imaging device; and determining the baseline reference point of the imaging device based on a configuration of the imaging device at the entry to the first mode.

19. The method of claim 14, further comprising:

in response to identifying a manual adjustment to the display unit:

setting a baseline reference point of the display unit to the position of the second reference point at a completion of the manual adjustment to the display unit, setting a first correction based on a difference between the first reference point and a baseline reference point of the imaging device, and reducing the first correction over one or more movement cycles; or in response to identifying a manual adjustment to the imaging device:

setting a baseline reference point of the imaging device to the position of the first reference point at a completion of the manual adjustment to the imaging device, setting a first correction based on a difference between the second reference point and a baseline reference point of the display unit, and reducing the first correction in one or more movement cycles.

20. The method of claim 14, further comprising, in response to determining that the repositionable structure cannot achieve the movement command:

determining haptic feedback based on a difference between a position of the first reference point that can be achieved and the target position of the first reference point;

determining joint forces or torques for joints in another repositionable structure configured to support the display unit based on the haptic feedback; and causing actuation of the joints in the another repositionable structure based on the determined joint forces or torques.

21. One or more non-transitory machine-readable media comprising a plurality of machine-readable instructions which when executed by one or more processors of a computer-assisted device comprising a repositionable structure, are adapted to cause the one or more processors to perform a method comprising:

determining, by the one or more processors, a position of a first reference point, the first reference point being offset from a display unit;

converting, by the one or more processors, a position of the first reference point to a target position of a second reference point, the second reference point being offset from an imaging device;

determining, by the one or more processors, based on the target position of the second reference point, a movement command of the repositionable structure that moves the imaging device such that the first reference point moves toward the target position, wherein the repositionable structure is configured to support the imaging device; and causing, by the one or more processors, actuation of the repositionable structure based on the movement command.

22. The one or more non-transitory machine-readable media of claim 21, wherein the second reference point is offset from the display unit by being in front of the display unit in a direction away from an operator, and the first reference point is offset from the imaging device by being in front of the imaging device in a direction of a field of view of the imaging device.

23. The one or more non-transitory machine-readable media of claim 21, wherein the method further comprises:
determining the offset of the first reference point based on:
   a zoom level of the imaging device; or
   a digital zooming or panning applied to an image shown by the display unit.

24. The one or more non-transitory machine-readable media of claim 21, wherein converting the position of the second reference point to the target position of the first reference point comprises:
   determining a first difference between the second reference point and a baseline reference point of the display unit;
   determining a second difference for the first reference point based on the first difference; and
   determining the target position of the first reference point from the second difference and a baseline reference point of the imaging device.

25. The one or more non-transitory machine-readable media of claim 21, wherein the method further comprises:
   in response to identifying a manual adjustment to the display unit:
   setting a baseline reference point of the display unit to the position of the second reference point at a completion of the manual adjustment to the display unit;
   setting a first correction based on a difference between the first reference point and a baseline reference point of the imaging device; and
   reducing the first correction over one or more movement cycles; or
   in response to identifying a manual adjustment to the imaging device:
   setting a baseline reference point of the imaging device to the position of the first reference point at a completion of the manual adjustment to the imaging device,
   setting a first correction based on a difference between the second reference point and a baseline reference point of the display unit, and
   reducing the first correction in one or more movement cycles.

* * * * *